Feb. 7, 1928.
C. DE MOOS
1,658,372
STRIP MEASURING MACHINE
Filed Nov. 29, 1921
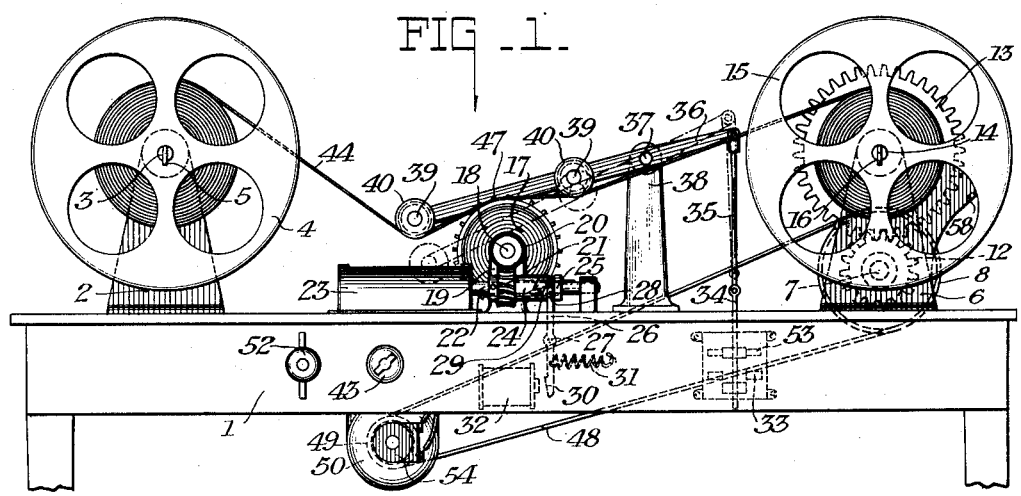
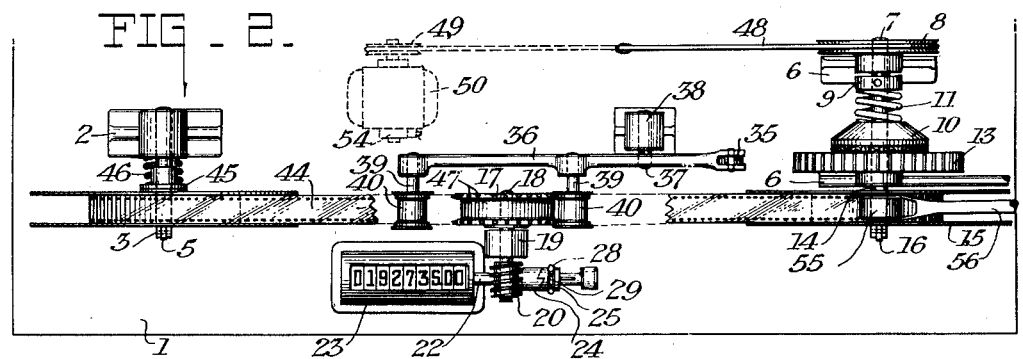
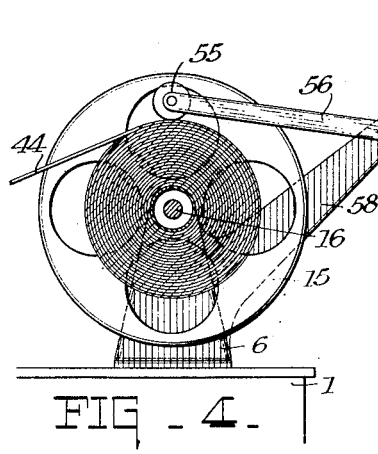
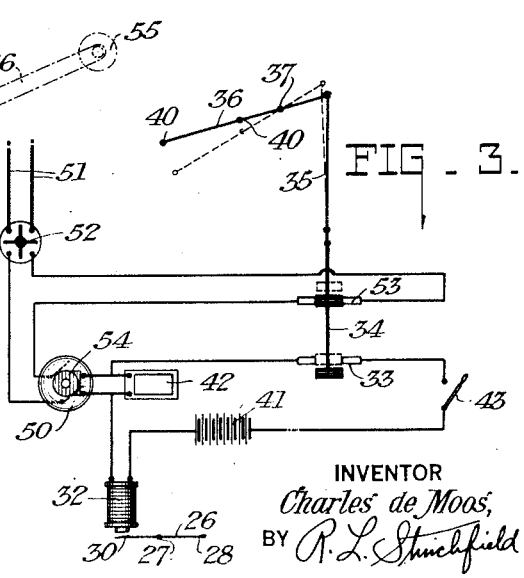
WITNESS
INVENTOR
Charles de Moos,
BY
ATTORNEY Patented Feb. 7, 1928.

1,658,372

UNITED STATES PATENT OFFICE.

CHARLES DE MOOS, OF FORT LEE, NEW JERSEY, ASSIGNOR TO EASTMAN KODAK COMPANY, OF ROCHESTER, NEW YORK, A CORPORATION OF NEW YORK.

STRIP-MEASURING MACHINE.

Application filed November 29, 1921. Serial No. 518,683.

This invention relates to strip measuring machines of general applicability but particularly useful for the measuring of finished motion picture positive strips or films. One object of the invention is to provide a device of this kind of improved accuracy. Another object of the invention is to provide a relatively simple and inexpensive device of this kind which will have safeguards against injury to the film. Still another object of the invention is to provide a measuring machine of this kind which will require the minimum of attention from the operator. Other objects will hereinafter appear.

In the accompanying drawing:

Fig. 1 is a side elevation of a machine embodying my invention;

Fig. 2 is a top plan view of the same;

Fig. 3 is a wiring diagram showing the scheme of electrical connections;

Fig. 4 is a vertical section through the wind-up reel perpendicular to the axis thereof, certain co-operating parts being shown in elevation.

In the preferred embodiment of my invention, which I shall describe by way of illustration, a table or support 1 carries at one end a bearing 2 having a horizontal shaft 3 upon which a supply reel 4 is rotatably held by the usual catch 5. At the other end of the machine is a pair of bearings 6 carrying shaft 7 driven by a pulley 8. On the shaft 7 is affixed a collar 9 between which and the friction member 10 is a spring 11 which urges the friction member 10 against the gear 12 which is loosely mounted on the shaft 7. Since the friction member 10 is keyed to the shaft 7, it rotates therewith and frictionally drives the gear 12. The latter meshes with and rotates the larger gear 13 on shaft 14. On this shaft is detachably fixed for rotation therewith the wind-up reel 15. The usual retaining clasp 16 may be employed. The shafts 3 and 14 are parallel and support the supply and wind-up reels in alignment, so that the strip, in this case illustrated as perforated motion picture film, is moved from one reel to the other in substantially the same plane.

During such movement the film passes over the measuring roll 17. The latter is attached to shaft 18 carried by bearing 19. The shaft 18 at its opposite end carries a worm 20 meshing with a worm wheel 21 rotatably mounted upon the shaft 22 of the registering instrument 23. The latter may be of any usual or preferred type. Rotating with the worm wheel 21 is a clutch member 24. A sliding clutch member 25 splined or keyed on shaft 22 may be moved into and out of operative engagement with the clutch member 24 through a lever 26 pivoted to the support at 27 and carrying at its top a fork 28 engaging in a groove 29 in the clutch member 25. When the parts are in the position shown in Figs. 1 and 2 the rotation of shaft 18 causes the worm 20 to rotate the worm wheel 21, thereby turning clutch member 24 which in turn rotates clutch member 25. The clutch member 25, through its keyed engagement with shaft 22, turns the latter and operates the registering mechanism. On the other hand, when the clutch member 25 is slid out to the right in Figs. 1 and 2 on the shaft 22 it slips out of operating engagement with clutch member 24 and the shaft 22 remains stationary.

In a commercially useful strip measuring machine the measuring roll must be driven at a fairly high rate of speed by the strip. When the end of the strip passes off from the roll, the latter has, therefore, considerable momentum stored up in it. If it remains connected with the registering instrument, then it will continue to operate the latter until its momentum is overcome. This would cause the instrument to register longer lengths of film then actually pass through the machine. By overcoming this defect, I have, therefore, greatly increased the precision of the machine. I provide means for automatically disconnecting the measuring roll from the registering instrument when the end of the film passes from the measuring roll.

In the preferred embodiment of my invention this automatic mechanism is electro-magnetically operated. Upon the rear end of the clutch-operating lever 26 is located an armature 30 which may be drawn against the action of spring 31 by the electromagnet 32. The circuit of the latter is controlled by a switch 33 operated by a plunger 34 carried on a link 35 which is pivoted to one end of a lever 36 which turns about stub shaft 37 on bearing 38. This lever on its other arm is provided with a pair of stud shafts 39 located at opposite sides of the measuring roll 17. These stub shafts carry idler rolls 40 which rotate freely thereon. These flanged idler rolls are cut away centrally, so that they engage the motion picture film only at the perforations or margins thereof, as is clearly shown in Fig. 2. The flanges of these idler rolls guide the edges of the strip and are in substantial alignment with the flanges of the supply and wind-up reels. In the circuit of the electromagnet 32 and switch 33 there is provided any suitable source of electric energy, such as indicated diagrammatically as a battery at 41 in Fig. 3. It is likewise convenient to have a buzzer 42 or other signal device located in series in the same circuit. A hand switch 43 is also convenient.

As is clearly shown in Figs. 1, 2 and 3, the strip 44 is threaded from the supply reel 4 under the first roller 40 and over the measuring roll 17, then under the other idler roll 40 and thence on to the wind-up reel 15. In order to put tension on the film, the supply reel may be frictionally braked by means of a relatively stationary friction disk 45 held against it by spring 46 (see Fig. 2). Of course, the braking action of the disk 45 is much less than the frictional driving action of the member 10. The strip 44 to be measured is, of course, held in tractive engagement with the measuring roll 17. While frictional engagement is satisfactory in many instances and supplementary rolls for pushing the strip against the measuring roll could be employed if necessary, I find that in the case of motion picture film it is desirable simply to provide the measuring roll with sprocket teeth 47 which engage in the perforations of the film, as will be readily understood. The face of the roll 17 between the sprocket teeth may be cut away to prevent contact with the middle of the film strip 44, as indicated in Fig. 2.

From inspection of Figs. 1 and 3 it will be seen that the film strip 44, being under tension, holds up the rolls 40 and thereby maintains the outer arm of lever 36 in its lower position. Consequently, link 35 and plunger 34 are maintained in their lower position with the switch 33 thus held open. When, however, the end of the film passes toward the measuring roll 17, the rolls 40 are no longer supported and, due to gravity, (reinforced by a spring if necessary) drop downwardly. The arm of lever 36 thereupon lifts link 35 and plunger 34, closing switch 33. Since switch 43 is in its closed position at this time, the circuit will be complete, the buzzer will give a signal and the electromagnet 32 will draw the armature 30 towards it, thereby disconnecting the clutch members 24, 25 and thus automatically disconnecting the registering instrument 23 from the measuring roll 17. The measuring roll 17 may then spin, due to its momentum, but without any harm. The parts of the registering instrument 23 are so constructed that the momentum of rotating shaft 22 is insufficient to cause false indications. When the buzzer thus rings, the operator turns to the machine and opens switch 43 to avoid wasting electrical energy. The signal, of course, tells him when the film has been measured. Between the time of threading up the machine and the getting of this final signal, he can be employed elsewhere. Thus one operator can attend to a series of such measuring machines without difficulty.

When the end of the film passes on to the wind-up reel 15, it tends to fly out, due to centrifugal force, and may become badly torn or abraded by engaging against the stationary parts of the machine. This undesirable result is particularly liable to happen if the wind-up reel continues to be power driven. It is, therefore, important that the wind-up reel be automatically brought to rest within a short time after the measuring operation is completed. I effect this result in the following manner: the pulley 8 which drives the shaft 7, and through the intermediate gearing drives the wind-up reel 15, is turned by a belt 48 engaging the smaller pulley 49 of the electric motor 50. This motor is connected to the power line 51 through the usual service switch 52 and through switch 53 which is actuated by the plunger 34. When the end of the film passes by the measuring roll 17 and the outer lever arm drops, then the consequent raising of plunger 34 will open the switch 53 and disconnect the motor 50 automatically.

While this will result in the winding reel 15 being brought stationary within a short time, it is desirable to minimize the rotation which may take place due to the momentum of the parts. I, therefore, provide on the shaft of motor 50 an electromagnetic brake 54 of any usual or preferred type. This brake may conveniently be located in the circuit of battery 41 in parallel with the buzzer 42, as indicated in Fig. 3. As a result of this arrangement the ending of the film and consequent raising of plunger 34 automatically disconnects the registering instrument, disconnects the motor, and puts a brake upon the shaft of the latter.

To facilitate the proper winding of the film upon the wind-up reel, I may further provide a small weighted roller 55 freely rotatable upon one end of link 56 pivoted at 57 to a bracket 58, extending outwardly from bearing 6. This roll and link may be swung out of the way when not in use (see Fig. 4).

The operation of the machine is as follows. The strip 44 is threaded from the supply reel 4 under the first roller 40 and over the measuring roll 17, then under the other roll 40 and thence to the wind-up reel 15. The parts will then be in the relative positions indicated in Figs. 1 and 2. The service switch 52 is then operated, thereby starting the motor 50 which drives the wind-up reel 15, thereby drawing the film past the measuring roll 17 and thus rotating the latter. The clutch members 24 and 25, Fig. 2, being in engagement, the registering instrument 23 registers the length of film passed over the measuring roll 17. When the end of the strip 44 passes from under roll 40 and ceases to support the latter, lever 36 lifts links 35 and plunger 34, closing switch 33 and opening switch 53. The closing of switch 33 actuates an electro-magnet 32, so as to pull armature 30 toward it, thereby disconnecting the clutch members 24, 25, Fig. 1. The measuring roll 17 then can spin without causing any errors in the registering instrument 23. The closing of switch 33 also completes the circuit through the buzzer 42 which calls the attention of the operator to the fact that the end of the strip has been reached. Switch 33 likewise closes the circuit of the brake 54. At substantially the same time the opening of switch 53 deenergizes the motor 50. These two facts bring the rotating parts, including the wind-up reel 15, to rest within a short time after the measuring operation is completed, momentum carrying the parts sufficiently to wind the end of the strip upon reel 15, where it is kept from flying out by the small weighted roller 55. It will thus be seen that a single element bearing on the strip controls the connection to the registering instrument, the motor, the brake and the audible signal. The operator, of course, opens switches 43 and 52 when the machine is not in use.

Having thus described my invention, what I claim as new and desire to secure by Letters Patent is:

1. In a strip measuring machine, a measuring roll over which the strip passes, a registering mechanism, an operating connection between said roll and mechanism, and means, including an element, which presses the strip toward said roll without itself contacting said roll, controlled by the strip for rendering said connection inoperative.

2. In a strip measuring machine, a supply reel, a measuring roll over which the strip passes from said reel, a registering mechanism, a clutch between said roll and mechanism, a feeler roll which is supported by the strip when under tension between said reel and measuring roll and drops when the end of the strip passes the feeler roll, and means between the feeler roll and clutch including a movable carrier for said feeler roll for throwing out the clutch when the feeler roll drops.

3. In a strip measuring machine, a measuring roll over which the strip passes, a registering mechanism, a clutch between said roll and mechanism, an idler roll which is supported by the tension in the strip at a bend in the strip adjacent the measuring roll and drops when the strip has passed, a member for shifting said clutch, and devices including a carrier for said idler roll between said idler roll and member for actuating the latter when the idler drops.

4. In a strip measuring machine, a measuring roll over which the strip passes, a registering mechanism, a clutch between said roll and mechanism, a pair of idler rollers, one on each side of the measuring roll, which are supported by the strip when under tension and drop when the strip has passed, a member for throwing out said clutch, and devices including a carrier for said idler rolls between said idler rollers and member for actuating the latter when the idler rolls are dropped.

5. In a strip measuring machine, a measuring roll over which the strip passes, means for putting said film under tension, a registering mechanism, a clutch between said roll and mechanism, a magnetic device for shifting said clutch, a switch in the circuit in said device, a control member which is supported by the strip, the member supporting forces being components of the tension forces in the film, and drops when the strip has passed, and connections between said member and switch for closing the latter when the member drops.

6. In a strip measuring machine, a measuring roll, means for moving the strip under tension across said roll, a registering mechanism, an operating connection between said roll and mechanism which may be rendered inoperative, and a movably mounted device cooperating with said connection, the position of said device being controlled by the tension of the film at the measuring roll, and said device controlling the operativeness of said connection when the position of said device is changed.

7. In a strip measuring machine, a measuring roll, a frictionally retarded supply reel and a frictionally driven wind-up reel in alignment with said measuring roll for drawing a strip in tractive engagement with said roll under tension, a registering mechanism, a clutch between said roll and mechanism, a lever, the end of which carries a roll supported by the tensioned strip and drops when the strip has passed, a member for shifting said clutch, and devices between said lever and member for actuating the latter when the end of the lever drops.

8. In a strip measuring machine, a measuring roll, means, including a driven wind-up reel, for drawing the strip to be measured across said measuring roll, a registering mechanism, a changeable operating connection between said measuring roll and registering mechanism, and means for changing said connection, means for bringing said wind-up reel to rest shortly after said changing, and devices controlled by the strip for governing the action of said last two means.

9. In a strip measuring machine, a measuring roll, means, including a wind-up reel, for drawing the strip across said measuring roll, means for driving the measuring roll, a registering mechanism, an operating connection between said measuring roll and registering mechanism, means for rendering said connection inoperative when the end of the strip passes the measuring roll, means for bringing said driving means and wind-up reel to rest thereafter with said end of said strip on said wind-up reel, said last two means including devices controlled by the strip for governing the action of said last two means.

10. In a strip measuring machine, a measuring roll over which the strip passes, means, including a wind-up reel for drawing the strip across said measuring roll, a registering mechanism connected with said measuring roll, a motor and a brake for governing the movement of said wind-up reel, and means, controlled by the passing of the end of the strip over the measuring roll, for deenergizing the motor and applying the brake to overcome the momentum in the reel when said end is wound on the latter.

11. In a strip measuring machine, a measuring roll over which the strip passes, a registering mechanism, an operating connection between said roll and mechanism which can be rendered inoperative, devices for drawing the strip past said roll, means for controlling the operativeness of said connection, means for controlling the motion of said devices, and an element controlled by the strip for governing both of said means.

12. In a strip measuring machine, a measuring roll over which the strip passes, a registering mechanism, a clutch between the roll and mechanism, devices, including a motor, for drawing the strip past said roll, an element supported by the strip, a device between said element and said clutch and motor for throwing out said clutch and stopping said motor when said support of the element ceases.

13. In a strip measuring machine, a measuring roll over which the strip passes, a registering mechanism, a clutch between the roll and mechanism, devices, including a motor, for drawing the strip past said roll, a brake for the motor, an element supported by the strip and devices between said element, said clutch, said motor and said brake for throwing out said clutch, stopping said motor and applying said brake when said support of the element ceases.

14. In a strip measuring machine, a measuring roll over which the strip passes, a registering mechanism, a clutch between the roll and mechanism, an audible signal, an element supported by the strip, and devices between said element and said clutch and signal for throwing out said clutch and operating said signal when said support of said element ceases.

Signed at Fort Lee, New Jersey, this 23 day of November 1921.

CHARLES DE MOOS.